Patented July 24, 1928.

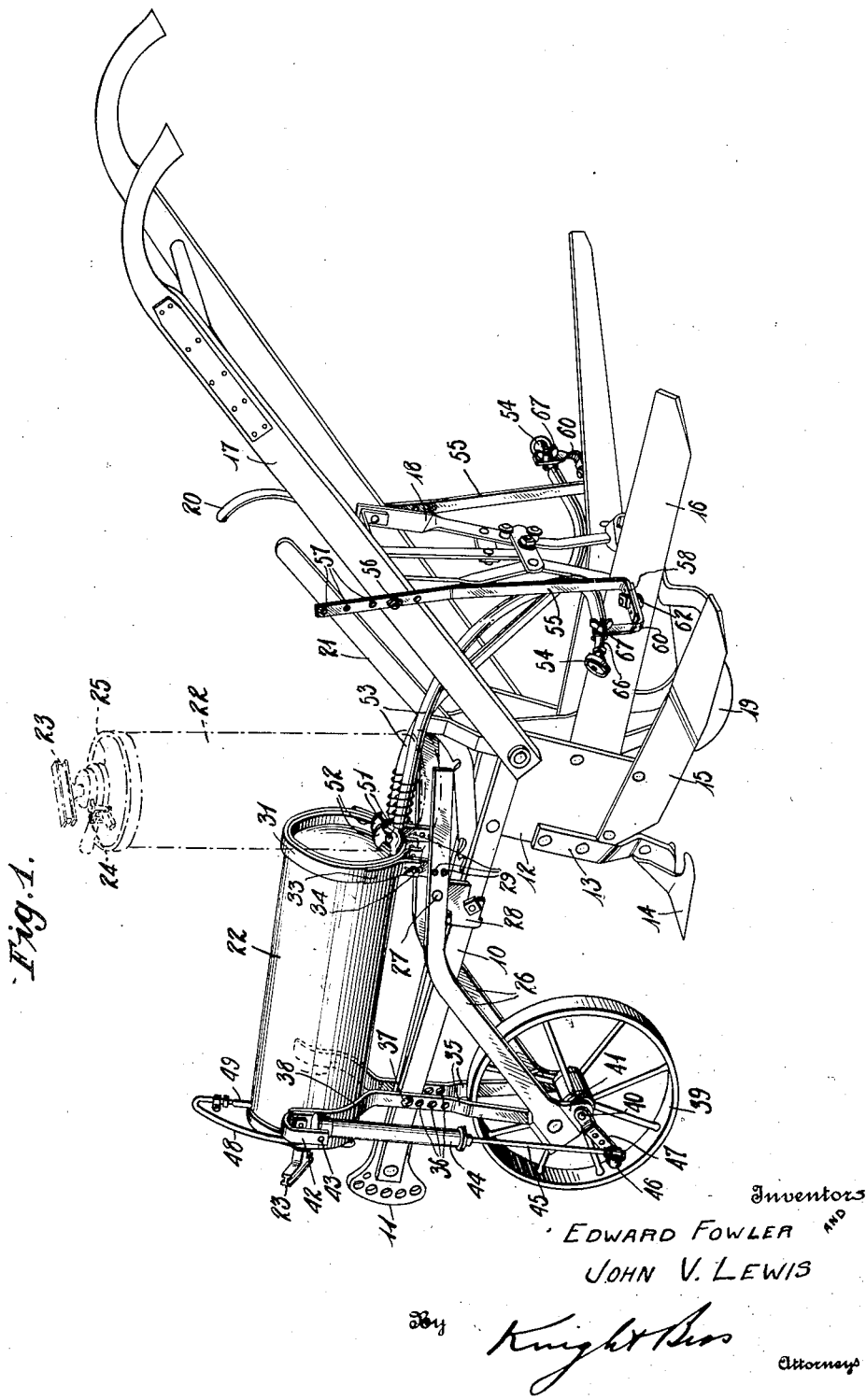

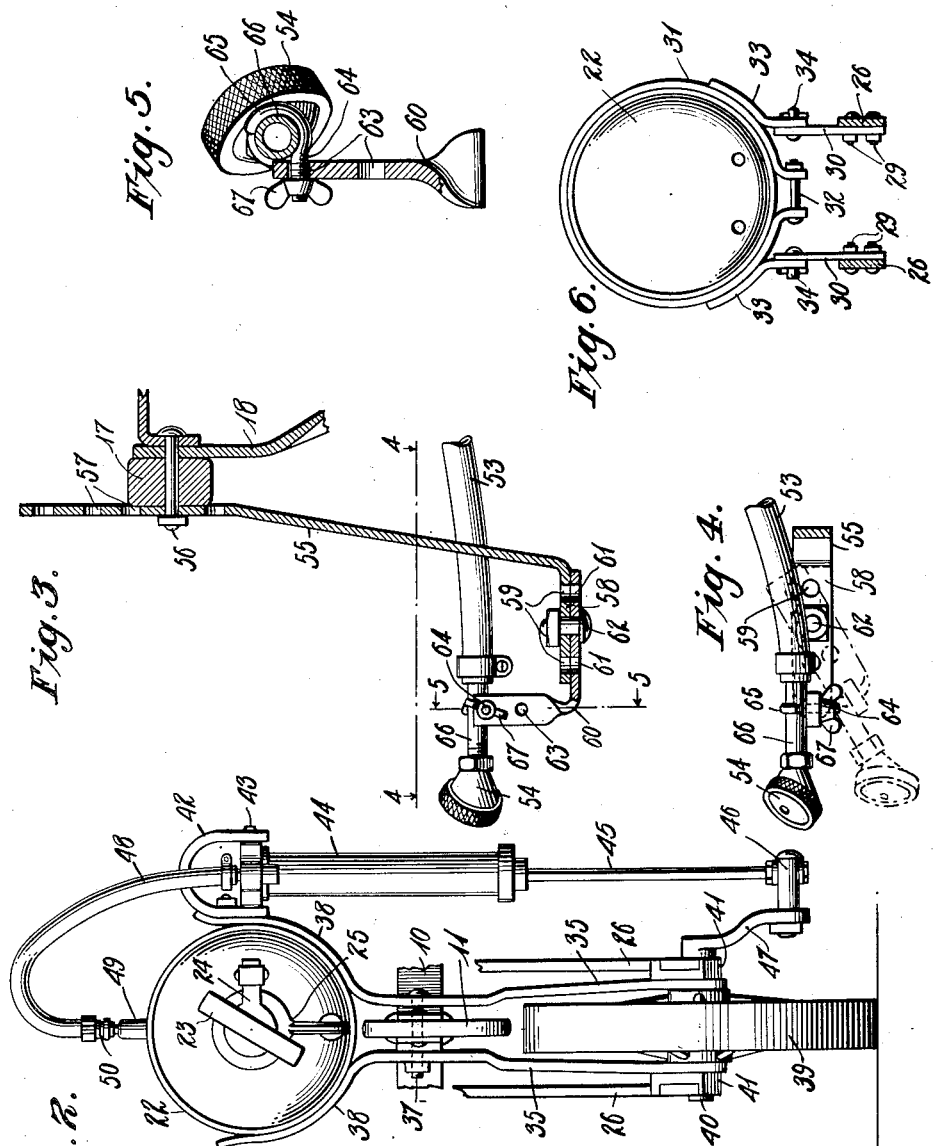

1,678,061

UNITED STATES PATENT OFFICE.

EDWARD FOWLER AND JOHN VICTOR LEWIS, OF CHATTANOOGA, TENNESSEE.

INSECTICIDE DISTRIBUTOR.

Application filed January 16, 1923. Serial No. 612,913.

This invention relates to an insecticide distributor and particularly to a device of this type whereby insecticide may be applied to growing crops whether in the form of a liquid or a powder.

Our invention is illustrated as employed in connection with a cultivator, this type of farming implement being used as an illustrative example only, our invention being designed to be mounted upon any type of wheeled device, but one preferably which is capable of being moved between rows of crops.

By mounting our invention upon a cultivator or the like the insecticide may be applied to the growing crops either while cultivating the same or application of the insecticide may be made without employing the cultivator, merely using the same as a wheeled vehicle to transport the insecticide distributor.

The arrangement and construction of our improved invention is such that the insecticide may be applied either to the under surface of the leaves of the crops where in most instances the bugs, insects or the like prefer to stay or to the upper surface of the leaves of the crops.

The novel combination, construction and arrangement of parts of our invention as well as the manner of operating the same, will be made more apparent as the description proceeds, especially when considered in connection with the accompanying drawings wherein:

Fig. 1 is a perspective view of a cultivator with our invention attached thereto, Fig. 2 is a front elevation of the structure illustrated in Fig. 1, Fig. 3 is a vertical section through one of the spray nozzle supporting arms, Fig. 4 is a fragmentary detail view taken on the plane indicated by line 4—4 in Fig. 3, Fig. 5 is a fragmentary sectional view taken on the plane indicated by line 5—5 in Fig. 3, and, Fig. 6 is a fragmentary sectional view of the pivotal supporting means for the spray can.

Referring now more particularly to Fig. 1, the main parts of the cultivator to which our invention is preferably attached will be described. The reference character 10 indicates the beams to which there is secured at the forward end a clevis 11. Frame plates 12 depend from the beams 10 and have secured thereto a plow-foot or carrier 13 to which is secured the plow point 14. Also secured to the frame plates 12 are a pair of lower cutting blades 15 and upper cutting blades 16. A pair of handles 17 extend rearwardly in the usual manner, these handles being supported by braces 18. Depth regulator feet are herein indicated by the reference character 19 and the adjusting lever is indicated by the reference character 20. 21 indicates the depth regulator lever.

Referring now more particularly to our invention, it will be noted that there is provided a reservoir or can 22 which is adapted to contain the insecticide, this can being provided with a manually-operated pump, the handle 23 of which is indicated, the pump rod extending through a cover 24 which closes an opening in the top of the can 22. A latch member 25 maintains the cover 24 closed against the pressure on the inside of the tank.

The can 22 is adapted to contain the insecticide and is normally positioned as indicated in full lines in Fig. 1 and supported in this position in a manner to be hereinafter referred to in detail. When, however, it is desired to refill the can and to build up a pressure therein by means of the hand pump 23, the can is moved to the position illustrated in dotted lines in Fig. 1.

For swingingly mounting the can 22 there is provided a pair of frame bars 26 which are pivoted as at 27 to clamp plates 28, clamped to the beams 10 of the cultivator. Fixed to the frame bars 26 by bolts 29 are lugs 30. Surrounding the end of the can 22 is a strap 31, the ends of which are spaced so that the strap may be tightened about the can 22 to grip the same by means of a bolt 32. Fixed to the strap 31 is a pair of strap-like members 33, the lower ends of which are pivoted to the upper ends of the lugs 30 by means of bolts 34. In this manner the can 22 is pivotally mounted so that it is capable of swinging from the full line position to the dotted line position, illustrated in Fig. 1.

Disposed adjacent the front of the cultivator are a pair of arms 35 which are connected to the beams 10 and form a supplemental frame. These arms 35 are provided with a plurality of apertures 36 which are adapted to be aligned with apertures formed in the beams 10 whereby a bolt 37 may be passed therethrough for adjustably connecting the front end of the beams 10 to this supplemental frame. In this manner the height of the main beams from the ground may be regulated. These arms 35 are spread or spaced outward as at 38 at their upper ends thus providing a support for the can 22 in its horizontal position. The lower ends of the arms 35 are spread apart to straddle a wheel 39 fixed on an axle 40 supported in journals 41. The lower ends of the arm 35 are secured to these journal bearings 41 as are also the forward ends of the frame bars 26.

Secured to one of the arms 35 at the upper end thereof is a bracket 42 to which there is pivotally supported as at 43 a pump 44. The pump rod 45 of the pump 44 is connected by crank pin 46 to a crank arm 47 fixed to the axle 40 of the wheel 39. Therefore as the wheel is rotated the pump is actuated. A flexible tube 48 connects the pump to a check valve 49 mounted on the can 22. Obviously, as the cultivator is moved and the wheel rotated, the pump 44 will be actuated to replenish the pressure in the tank 22. A coupling 50 will be preferably provided for connecting the end of the tube 48 to the check valve 49 so that the tube may be readily disconnected when the can 22 is swung to its vertical position.

A pair of discharge tubes 51 are provided in the bottom of the can 22, valves 52 being preferably inserted therein for controlling the discharge of the insecticide. Flexible tubes 53 are connected to these discharge tubes for supplying the insecticide, these tubes being provided with delivery nozzles 54 preferably designed to spray the insecticide upon the crops. The ends of the delivery tubes 53 as well as the delivery nozzles 54 are adjustably supported by arms 55 adjustably connected to the handles 17 of the cultivator by means of bolts 56 and a plurality of apertures 57. The lower ends of these arms 55 are bent outwardly as at 58 and provided with a plurality of apertures 59. A second L-shaped arm 60 cooperates with each of the arms 55, the L-shaped arm having one leg thereof lying adjacent the angular portion 58 of the arm 55. This leg of the L-shaped member is provided with a plurality of apertures 61, a bolt 62 being adapted to pass through a pair of the aligned apertures 59—61. In this manner a transversely extensible connection is provided as well as a swinging or hinged connection as illustrated in Fig. 4, thus enabling the position of the arm 60 to be regulated to properly position the delivery nozzle 54.

The vertical leg of each L-shaped arm 60 is provided with a plurality of apertures 63 adapted to receive a bolt 64 having a hook shaped end 65, adapted to substantially surround the stem 66 of the delivery nozzle 54. A thumb nut 67 engages the threaded end of the bolt 64 for adjustably connecting the bolt 64 to the arm 60.

Obviously the nozzle 54 may be adjusted vertically with respect to the vertical leg of the arm 60 and may furthermore, be rotated or swung with reference to the bolt 64, thus providing a sort of swivel connection whereby the angle of the delivery nozzle may be varied as desired to apply the insecticide to the crops in the most efficient manner.

The manner of using our improved insecticide distributor will be immediately apparent from the foregoing description, it being clear that the filling of the container is facilitated by reason of the fact that it may be swung to a vertical position. Obviously, when filling the can 22 and while operating the pump 23 the valves 52 will be closed. The can 22 is then moved to the full line position illustrated in Fig. 1 and the tube 48 connected to the check valve 49. The position of the delivery nozzles 54 is then attended to, these delivery nozzles being arranged to deliver the insecticide either to the under side of the leaves of the plants or to the upper side of the plant leaves. Obviously, vertical adjustment to accommodate the arrangement to plants of various heights may be accomplished by means of the bolts 56 and apertures 57. The other desired adjustment may be accomplished by reason of the connection between the L-shaped arms 60 and the angular ends of the arms 55 and also by reason of the connection between the delivery nozzles and the vertical legs of the arms 60.

As the cultivator is wheeled between the rows of crops the pump 44 is actuated to replenish the air pressure in the can 22 as will be immediately apparent. Obviously the beams 10 may be adjusted for regulating the depth of cut without affecting the operation of the pump 44 because the pump is fixed relatively to the supplemental frame formed by the arms 35.

With an insecticide distributor constructed in accordance with our invention, either liquid or powder may be sprayed or dusted with equal facility and efficiency. It is not absolutely necessary to use the cultivator each time insecticide is applied as the cultivator may be drawn between the rows of crops and used merely as a vehicle.

However it is economical and efficient to be able to cultivate and distribute insecticide simultaneously, if desired.

Various modifications may be resorted to in the details of construction illustrated herein and to this end reservation is made to make such changes as may come within the purview of the accompanying claims.

Having thus described our invention, what we claim is:

1. An insecticide distributor comprising a wheeled vehicle, an elongated container for the insecticide, means for normally supporting said container in horizontal position, said means comprising a pivotal connection between one end of said container and the vehicle and a rest on the vehicle for the other end of the container, said container having a filling opening at its end remote from said pivotal connection and being swingable about the latter into an upright position, and a delivery nozzle supported by said vehicle and connected to said container.

2. A distributor comprising a vehicle, an elongated container having a filling opening in one end thereof, and means for normally supporting said container in horizontal position comprising means for pivotally mounting the end of said container remote from said filling opening on said vehicle, and a yoke on said vehicle for normally supporting the other end of said container.

3. The combination with an agricultural implement having a drawbar of a distributor comprising an elongated container having a filling opening in one end thereof, and means for normally supporting said container in horizontal position comprising two upwardly extending angularly related pairs of frame bars attached to said drawbar, means for pivotally mounting the end of said container remote from said filling opening upon the upper end of one of said pairs of frame bars, the upper end of the other pair projecting in the form of a yoke for normally supporting the other end of said container.

4. The combination with a wheeled vehicle of an insecticide distributor comprising a container, means pivotally connecting said container at one end to said vehicle whereby the container may be swung to an upright position, a supplemental frame adjustably connected to the vehicle and providing in combination with said pivotal connection, means for supporting the container in horizontal position, an air compressor supported by said supplemental frame, said air compressor being operatively connected to a wheel of said vehicle, means disengageably connecting said air compressor to said container, a delivery nozzle, a flexible tube connecting said delivery nozzle to said container, sectional supporting arms vertically adjustable on said vehicle, said arms being transversely and horizontally adjustable relative to each other, and means swivelly connecting said arms to said delivery nozzle.

5. The combination with a wheeled vehicle of an insecticide distributing apparatus comprising a frame detachably and straddlingly secured to said vehicle, an insecticide container, means pivotally securing one end of said container to said frame, said frame providing means for normally supporting said container in a horizontal position, a compressor operatively connected to a wheel of said vehicle and supported by said frame, delivery nozzles and flexible delivery tubes connecting said nozzles to said container and means adjustably supporting said delivery nozzles upon said vehicle for universal angular adjustment.

6. The combination with an agricultural implement having a drawbar and a distributor comprising a container and means for creating a pressure in said container, said means being adapted to be operated by moving contact with the ground, of a frame for supporting said distributor on said drawbar comprising bars extending above and below said drawbar and secured thereto, means for mounting said container on the upper ends of said bars, and means for mountiing said pressure creating means on the lower ends of said bars in position to engage the ground when the implement is in operation.

7. The combination with an agricultural implement having a drawbar of a distributor detachable as a unit from said implement, comprising frame bars detachably secured to said drawbar, a container mounted on said frame bars, a pump for creating a pressure in said container, a wheel mounted on said frame bars in position to engage the ground, and connections between said wheel and said pump for driving the latter.

EDWARD FOWLER.
JOHN VICTOR LEWIS.